(12) United States Patent
Gupta et al.

(10) Patent No.: US 10,185,817 B2
(45) Date of Patent: Jan. 22, 2019

(54) DEVICE SECURITY VIA SWIPE PATTERN RECOGNITION

(71) Applicant: International Business Machines Corporation, Armonk, NY (US)

(72) Inventors: Megha Gupta, Nanded (IN); Apurva Kumar, Noida (IN); Ashish Kundu, Elmsford, NY (US); Amit Anil Nanavati, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

(21) Appl. No.: 15/184,732

(22) Filed: Jun. 16, 2016

(65) Prior Publication Data
US 2017/0364673 A1    Dec. 21, 2017

(51) Int. Cl.
*G06F 21/36* (2013.01)
*G06N 99/00* (2010.01)

(52) U.S. Cl.
CPC ........... *G06F 21/36* (2013.01); *G06N 99/005* (2013.01)

(58) Field of Classification Search
CPC .............................. G06F 21/36; G06H 99/005
See application file for complete search history.

(56) References Cited

U.S. PATENT DOCUMENTS

| 6,275,611 | B1* | 8/2001 | Parthasarathy | G06K 9/4604 |
| | | | | 382/187 |
| 7,302,099 | B2* | 11/2007 | Zhang | G06K 9/222 |
| | | | | 382/185 |
| 9,747,191 | B1* | 8/2017 | Marolia | G06F 11/3664 |
| 2010/0133338 | A1* | 6/2010 | Brown | G06F 21/32 |
| | | | | 235/382 |
| 2012/0230577 | A1* | 9/2012 | Calman | G06Q 20/042 |
| | | | | 382/138 |
| 2013/0326613 | A1* | 12/2013 | Kochanski | G06F 21/32 |
| | | | | 726/19 |
| 2014/0194063 | A1* | 7/2014 | Bahadirov | H04W 8/005 |
| | | | | 455/41.2 |

(Continued)

OTHER PUBLICATIONS

Govindarajan, Sathya et al., "Secure Privacy-Preserving Protocols for Outsourcing Continuous Authentication of Smartphone Users with Touch Data", 2013 IEEE 6th International Conference on Biometrics: Theory, Applications and Systems (BTAS 2013), Sep. 29-Oct. 2, 2013, Washington, D.C., USA, 12 pages, IEEE Digital Library.

(Continued)

*Primary Examiner* — Eleni A Shiferaw
*Assistant Examiner* — Sher A Khan
(74) *Attorney, Agent, or Firm* — Ference & Associates LLC

(57) ABSTRACT

One embodiment provides a method for ensuring device security via swipe pattern recognition, the method comprising: utilizing at least one processor to execute computer code that performs the steps of: receiving, using a touch device, at least one swipe input of a user; determining, using the at least one processor, if the at least one swipe input matches a known swipe pattern of the user, the match requiring exceeding a match confidence level; and responsive to said determining, executing an action associated with the touch device. Other aspects are described and claimed.

16 Claims, 3 Drawing Sheets

(56) References Cited

U.S. PATENT DOCUMENTS

| | | | |
|---|---|---|---|
| 2014/0222526 A1* | 8/2014 | Shakil | G06Q 50/22 705/7.38 |
| 2014/0289819 A1 | 9/2014 | Lindemann | |
| 2014/0331187 A1* | 11/2014 | Hicks | G06F 3/0488 715/845 |
| 2015/0040193 A1 | 2/2015 | Clemons | |
| 2015/0078613 A1* | 3/2015 | Forutanpour | G06F 3/017 382/103 |
| 2015/0100885 A1* | 4/2015 | Riley | H04M 1/72519 715/720 |
| 2015/0199504 A1* | 7/2015 | Feng | G06F 21/36 726/28 |
| 2015/0248789 A1* | 9/2015 | Abovitz | G06K 9/00671 345/633 |
| 2015/0309582 A1* | 10/2015 | Gupta | G06F 3/011 345/156 |
| 2016/0261903 A1* | 9/2016 | Epstein | H04N 21/42227 |
| 2017/0169199 A1* | 6/2017 | Clarke | G06F 21/31 |
| 2018/0033013 A1* | 2/2018 | Park | G06Q 20/325 |
| 2018/0096321 A1* | 4/2018 | Haldenby | G06F 3/0482 |
| 2018/0196990 A1* | 7/2018 | Xu | G06F 3/048 |

OTHER PUBLICATIONS

Giura, Paul et al., "Is It Really You? User Identification Via Adaptive Behavior Fingerprinting", CODASPY'14, Mar. 3-5, 2014, San Antonio, Texas, USA, 12 pages, ACM Digital Library.

De Luca, Alexander et al., "Touch me once and I know it's you! Implicit Authentication based on Touch Screen Patterns", CHI'12, May 5-10, 2012, Austin, Texas, USA, 10 pages, ACM Digital Library.

Feng, Tao et al., "Continuous Mobile Authentication using Touch-screen Gestures", 2012 IEEE Conference on Technologies for Homeland Security (HST), Nov. 13-15, 2012, Waltham, MA, USA, 6 pages, IEEE Digital Library.

Sae-Bae, Napa et al., "Biometric-Rich Gestures: A Novel Approach to Authentication on Multi-touch Devices" CHI'12, May 5-10, 2012, Austin, Texas, USA, 10 pages, ACM Digital Library.

Frank, Mario et al., "Touchalytics: On the Applicability of Touchscreen Input as a Behavioral Biometric for Continuous Authentication", Oct. 8, 2012, 20 pages, available at: http://arxiv.org/pdf/1207.6231v2.pdf.

* cited by examiner

DEVICE SECURITY VIA SWIPE PATTERN RECOGNITION

BACKGROUND

Mobile Electronic devices (e.g., smart phones, tablets, etc.) are more common today than ever before. As the capability of these devices has increased, so has their role in our lives. Actions that would have previously only been carried out on a computer, such as banking, shopping, gaming, etc., are now done on mobile devices. Because of this increased capability, mobile devices are being granted access to more important and confidential information than ever before. For example, many individuals access their bank account via their mobile devices, and perhaps even save their credentials locally on the mobile device.

This can create a problem in that mobile devices can be easily lost or stolen. Unlike personal computers, mobile devices are taken everywhere with a user and are thus more likely to end up in the hands of others without a user's knowledge or permission. Because of this increased risk, a high level of mobile devices security is paramount. However a large number of people still fail to lock their devices because constantly unlocking it can be burdensome (e.g., requiring a code to unlock the device prior to each use). Thus, a solution is needed that allows a mobile device to remain as secure as possible while also not being overly burdensome to a user.

BRIEF SUMMARY

In summary, one aspect of the invention provides a method for ensuring device security via swipe pattern recognition, the method comprising: utilizing at least one processor to execute computer code that performs the steps of: receiving, using a touch device, at least one swipe input of a user; determining, using the at least one processor, if the at least one swipe input matches a known swipe pattern of the user, the match requiring exceeding a match confidence level; and responsive to said determining, executing an action associated with the touch device.

Another aspect of the invention provides an apparatus for ensuring device security via swipe pattern recognition, the apparatus comprising: a touch surface; at least one processor; and a computer readable storage medium having computer readable program code embodied therewith and executable by the at least one processor, the computer readable program code comprising: computer readable program code that receives, using the touch surface, at least one swipe input; computer readable program code that determines, using the at least one processor, if the at least one swipe input matches a known swipe pattern, the match requiring exceeding a match confidence level; and computer readable program code that, responsive to said determination, executes an action associated with the apparatus.

An additional aspect of the invention provides a computer program product for ensuring device security via swipe pattern recognition, the computer program product comprising: a computer readable storage medium having computer readable program code embodied therewith, the computer readable program code comprising: computer readable program code that receives, using a touch device, at least one swipe input; computer readable program code that determines, using at least one processor, if the at least one swipe input matches a known swipe pattern, the match requiring exceeding a match confidence level; and computer readable program code that responsive to said determination, executes an action associated with the touch device.

A further aspect of the invention provides a method of passive privacy preserving authentication for touch devices, the method comprising: receiving, at a touch device, a sequence of strokes; grouping, based on stoke characteristics, similar strokes; generating, based on the grouped similar strokes, a user alphabet; receiving, at the touch surface, at least one additional stroke; determining, using a processor, if the at least one additional stroke shares one or more characteristics with the user alphabet; and responsive to determining whether the at least one additional stoke does not share one or more characteristics with the user alphabet, securing the touch device.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
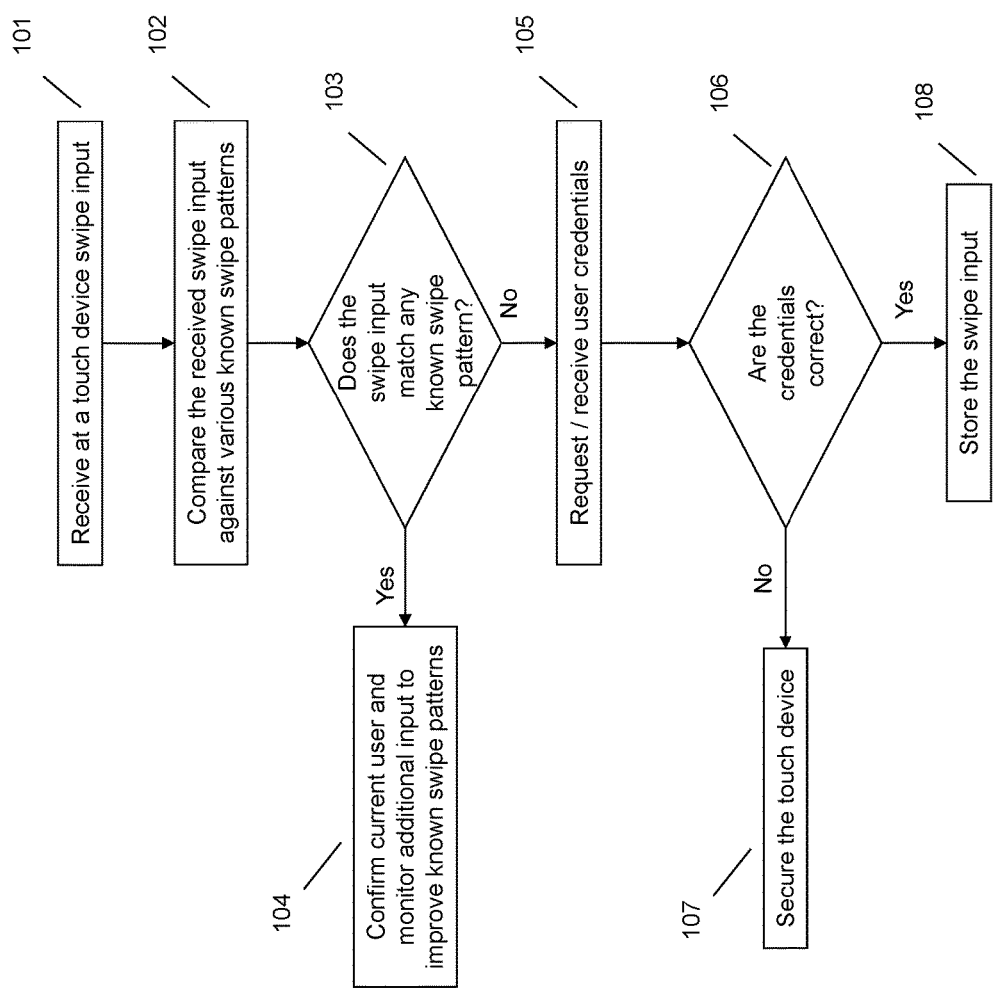
FIG. 1 illustrates an example method of ensuring device security via swipe pattern recognition.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

As discussed herein, electronic devices are regularly used for accessing sensitive information, particularly, financial or personal information about a user (e.g., the device owner). Thus, device security is a high priority for users. For example, if a device (e.g., smart phone, tablet, laptop, etc.) fell into wrong hands, a user may wish to ensure their information is inaccessible and safe from a potential intruder. Accordingly, it is beneficial if a device is able to determine whether the current user (e.g., the potential intruder) is not the owner of the device. Typically this can be accomplished using a password or other type of log in credential (e.g., voice command, facial recognition, etc.).

However, login credentials can be burdensome to enter and reenter. Additionally, they can be circumvented in various ways (e.g., identity theft, etc.). Thus, a solution that allowed a device to detect an unauthorized user without the additional burden of repetitive login credentials would be advantageous in terms of ease of use and user security.

Accordingly, an embodiment provides a method for learning and monitoring an authorized user's typical interaction behavior with a device including interaction with specific applications. An embodiment performs this monitoring in the background in an unobtrusive and a privacy-preserving manner, so that the exact details of the user's interactions/transactions may not revealed to the user or potential unauthorized users.

Such a system provides a technical improvement over current systems for ensuring device security in an unobtrusive and precise manner. Thus, an embodiment may receive, at a touch device, swipe input from a user. The received swipe input is then compared against at least one known swipe pattern(s). These known patterns may be determined via machine learning using historical user interactions during normal device usage. If the received swipe input does not match one of the available known patterns, the touch device may take some action (e.g., locking the device, prompting for further authentication, remote wipe, etc.) as discussed further herein.

Turning now to FIG. 1, an embodiment may receive at a touch device swipe input at 101. By way of example, the touch device may be a mobile phone, tablet, or personal computer (e.g., PC with a touch screen or touch pad). Additionally, the touch device may use any available method of touch detection, such as resistive, surface acoustic wave, capacitive (surface capacitance and projected capacitance), infrared grid, optical and the like. The received swipe input may be related to a specific application, specific function, or just general to navigation of a user interface (UI) (e.g., the operating system).

Once the swipe input is received at 101, an embodiment then compares it against various known swipe patterns at 102. The known swipe input patterns are determined using a machine learning process. The machine learning monitors a user's touch input (e.g., swipes) entered at the touch device and records it. An embodiment then groups the recorded input swipes based on various characteristics, as discussed herein, to determine similar swipe patterns (i.e., known swipe patterns).

Figure 2:
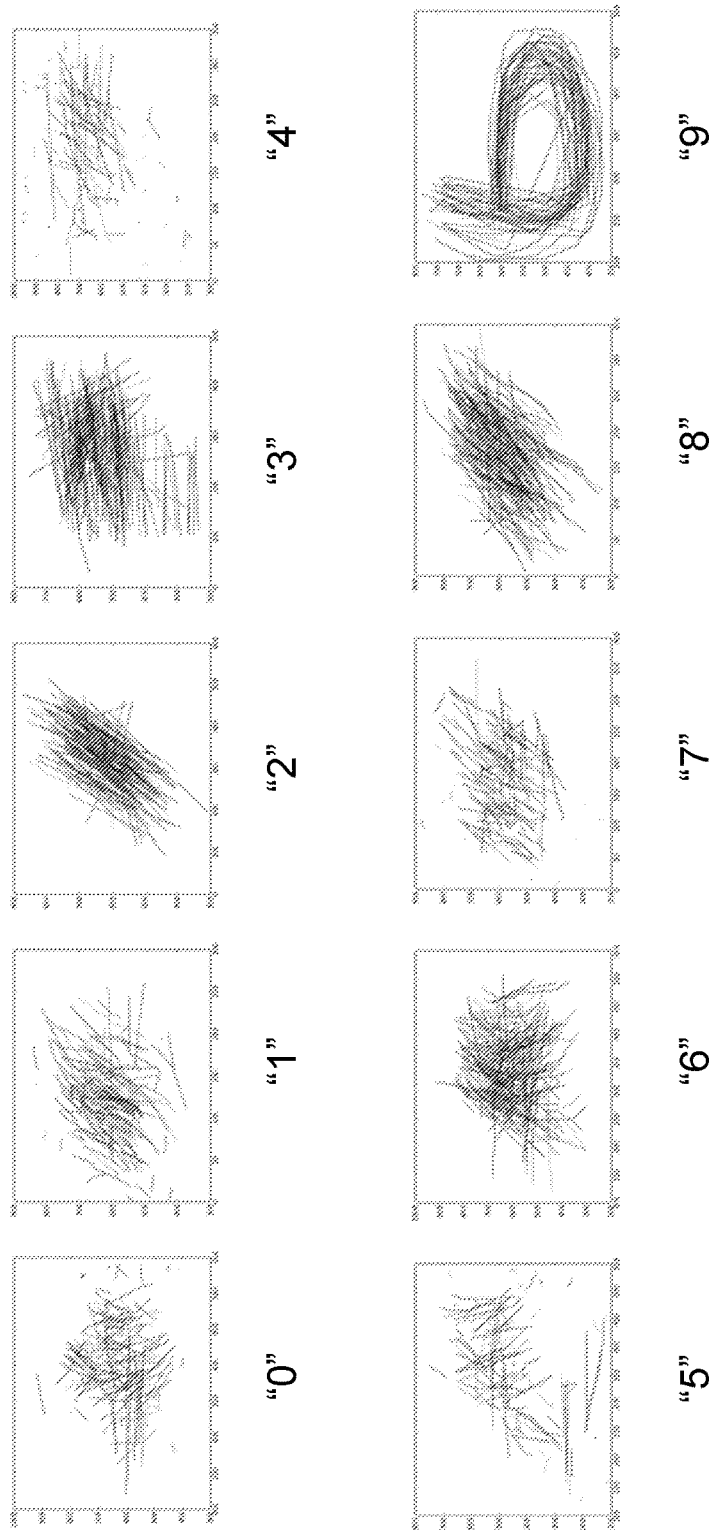
FIG. 2 illustrates an example of a swipe alphabet of a particular user.

Referring now briefly to FIG. 2, a sample of a single user's swipe alphabet is shown. In one embodiment, each of the numerals (e.g., 0, 1, 2, 3, 4, etc.) represent different sets of grouped swipes. The grouped swipes may generally be associated with a single user. Thus, in one embodiment, different users may have different swipe alphabets with more or less identified patterns. The grouping is determined based on a variety of factors, discussed herein, such as, swipe speed, swipe acceleration, swipe length, swipe shape, swipe pressure, etc.

For example, in one embodiment, the application currently being utilized may be taken into account. By way of specific example, if a user is browsing the Internet using a mobile browser, he or she may be regularly swiping from bottom to top in order to scroll down the page when viewing the website. This bottom to top swipe may be very different based on a user's preferences or physical characteristics. For example, a user with a larger hand may only need one hand to swipe from bottom to top and thus the swipe will likely contain an arcing feature. On the other hand, a user with smaller hands may require two hands to perform the bottom to top swipe, and thus the swipe will be straighter and not contain the arc feature. Because of the different physical characteristics and preferred method of device interaction, different users will typically have varying swipe patterns.

Additionally, an embodiment may take into consideration factors beyond the characteristics of the swipe (e.g., speed acceleration, length, shape, pressure, etc.). For example, an embodiment may use one or more devices sensors (e.g., accelerometers, gravity sensors, gyroscopes, rotational vector sensors, etc.) to monitor the motion of the electronic device. This additional information may be used in determining the proper grouping for received swipe input. For example, if a touch surface is being used while on a train or subway, the swipe pattern may be different than when the device is used while it is stationary. Thus, an embodiment may create additional groupings for swipe input received depending on the perceived motion of the device.

Additionally, an embodiment may detect environmental characteristics (e.g., air temperature, barometric pressure, illumination, humidity, etc.) using additional device sensors (e.g., thermometers, photometers, barometers, etc.). Similar to the previously discussed motion detection, these characteristics may be considered when swipe input is received. Thus, an embodiment may create additional groupings based on specific environmental circumstances. By way of non-limiting example, a user may shiver or swipe more quickly when cold; thus, an embodiment may categorize swipes received when temperatures are very low differently than swipes received at room temperature.

In one embodiment, positional sensors (e.g., orientation, manometer, etc.) may be used to determine an angle or position the device is being held at. As discussed, these additional factors can be used to better group the received swipe input. For example, if the touch device is determined to have its screen facing down, the user may be lying in bed or on a sofa and thus more likely to be using two hands, thus altering the potential swipe pattern.

In an additional embodiment, location sensors can detect location information (e.g., Global Positioning System (GPS) information, assisted GPS information, synthetic GPS information, cell tower identification information, Wi-Fi information, short range wireless information, terrestrial transmitter information, etc.). This information may be used to further refine the swipe grouping carried out via the machine learning. In a further embodiment, user travel patterns may be identified using location information of a user. For example, a user may travel to work at approximately the same time every day, and this information could be utilized when determining characteristics of swipe input.

Additionally or alternatively, the gathered information (e.g., application type, motion, swipe characteristics, environmental characteristics, positional information, motion characteristics, etc.) may be used to determine user habits or patterns. By way of continuing non-limiting example, a user may commute to work at approximately the same time of day every day via train, which causes a specific type of motion on the device. Additionally, the user may generally have the same pattern of activities (e.g., checking email then logging onto a particular social media application). Thus, an embodiment may consider the location information, the motion information, and the application information to better anticipate a user's patterns and more accurately group and predict the received swipe input. A further embodiment may utilize this information to detect typical swipe sequences or swipe sequence windows as further discussed herein.

Although the additional information gathered relating to the swipe (e.g., application type, motion, swipe characteristics, environmental characteristics, positional information) greatly increases the accuracy of the swipe grouping and detection, a further embodiment may take additional steps to verify the accuracy of the interpreted swipe input. For example, one embodiment may receive and analyze a sequence of strokes. Thus, an embodiment may detect that a single swipe input matches a known swipe pattern (e.g., a value of the swipe alphabet as shown in FIG. 2). Following the first swipe input, a user then enters one or more additional swipe inputs that are also identified as matching known swipe patters (within the swipe alphabet). As a further discussion of the above example, a user carries out the same usage pattern (e.g., email then social media), thus an embodiment can record regularly entered swipe pattern sequences. Using these series of swipe inputs, an embodiment can detect patterns in the user's swipe input.

By way of further non-limiting example, a user may have a pattern of unlocking his or her device and immediately checking new notifications. The combination of these actions could be identified as a regular swipe pattern sequence used by the user. Thus, an embodiment may not only detect if a swipe pattern is associated with or corresponds to a known swipe pattern in the pattern alphabet, but it may also determine if a sequence of swipe inputs matches a known sequence of swipe patterns.

In another embodiment, the detection of swipe pattern sequences may also be associated with a particular time frame or time window (e.g., 5 seconds, 20 seconds, 2 minutes, etc.). Thus, similar to monitoring the sequence of received swipe patterns, an embodiment may monitor the sequence while also determining if the sequence took place within a predetermined time frame, wherein the predetermined time frame is based on previously entered swipe pattern sequence time windows. By way of specific example, a user may enter an unlock pattern (e.g., pattern 9 in FIG. 2), swipe down to view current notifications (e.g., pattern 2 in FIG. 2), and swipe in a direction to access a separate page on the home screen (e.g., pattern 3 in FIG. 2) all within a 15 second time frame. This pattern and timing may be a recognized pattern that the user performs 90% of the time after first initiating interaction with the device.

The following are non-limiting examples of potential sequences. It should be understood that the integer values shown in the following examples correspond to identified swipe patterns (i.e., characters in the user's swipe alphabet). One example may be that the swipe patterns 0, 6, 9 occur very often (more than 50% of the sessions), followed by 4 and 5. Additionally, the sequence 6, 6 may occur during 34% of user interaction sessions. Other frequently occurring sequences may be for example: [0, 6]; [6, 0]; [5, 5]; [4, 5]; [0, 5]; [5, 0]; [4, 4]; and [0, 0]. In addition to sequences, an embodiment could determine that particular swipe patterns are simply so prevalent that they should be anticipated. For example, it may be that 94% of the time, one of 3, 4, 5, 6, or 7 should appear in any sequence of 10 swipes.

In one embodiment, the swipe patterns (i.e., the swipe alphabet), such as that shown in FIG. 2, may be assigned to a specific user. For example, an embodiment may create a user profile and associate any grouped swipes or identified swipe patterns with that user profile. The user profile may be created based on various factors. For example, an embodiment may require a user to manually request (e.g., via user interface) the creation of a new profile and then associate all subsequent approved (e.g., via login credential or other authentication method) swipe input with the generated user profile. In a further embodiment, the additional information gathered (e.g., application type, motion, swipe characteristics, environmental characteristics, positional information, etc.), as discussed herein, may also be associated with the user profile.

Additionally or alternatively, an embodiment may employ the machine learning in a way that is indifferent regarding the additional information. For example, an embodiment may monitor and determine characteristics about user behavior patterns without knowing the semantics of the application the user is using (e.g., by ignoring which application is being used, anonymizing the application's identity, etc.).

Referring back to FIG. 1, once an embodiment has received the swipe input at 101, and compared it to various known swipe input patterns, as discussed herein, at 102, it may determine if the swipe input matches any of the known swipe patterns (e.g., the user alphabet) at 103. An embodiment may base the matching on a confidence level. Due to the fact that the known swipe patterns may vary to some degree, the user alphabet, as shown in FIG. 2, may have a certain degree of variance between each individual swipe grouped together. For example, swipe alphabet 0 in FIG. 2 may include swipes that are longer, shorter, faster, at a different angle, etc. Thus, the use of a confidence level allows an embodiment to reduce misidentifying received swipe input as being outside of the known alphabet.

In additional embodiment, the confidence level may be determined based on a specific user profile. For example, one user might have a more exact swipe pattern when performing a task, while a second user's swipe pattern is more erratic and dissimilar than previously received swipe inputs. Thus, an embodiment may, via machine learning, customize a user's match confidence level based on the user's historical input. Additionally or alternatively, an embodiment may adjust the confidence level of the match based on the function of the device. By way of non-limiting example, a corporate device (e.g., a device with access to business emails, documents, etc.) may require more security and thus justify the use of a higher confidence level than a personal device. This also increases usability of a device, as a typical user would not want to constantly reenter credentials into their personal device due constant incorrect identifications.

If an embodiment determines, as discussed herein, that the received touch input matches the known swipe at 103, the user is confirmed as an authorized user and the swipe input is stored and/or grouped into the user's alphabet for improving later identification at 104. This continual monitoring, storing, and grouping, allows the user's swipe alphabet (i.e., the user's swipe pattern database) to be as current as possible, thereby increasing the accuracy of the comparison.

Alternatively, an embodiment may determine that the swipe input received at 101 does not match any of the known swipe patterns at 103. An embodiment may then take various actions. For example, an embodiment may request additional user credentials at 105. The additional user credentials may be, for example, user identification and password, finger print, voice signature, facial recognition, or any known method of user authentication. An embodiment may then verify the received user credentials at 106. If an embodiment determines that the user credentials are inaccurate, a security protocol may be enacted to secure the touch devices at 107. Some non-limiting examples of the actions taken by the security protocol may be: restricting access to all or some applications, restricting the functionality of all or some applications, transmitting a notification to a secondary device (e.g., via email, text message, etc.) that an unauthorized user is entering swipe input to the touch device, and in extreme cases, perhaps even a remote wipe of the device.

However, if the entered credentials are determined to be correct at 106, an embodiment may store the swipe input at 108. Prior to storing the swipe input, a further embodiment may request additional information. For example, an embodiment may ask a user if he or she wishes to create an additional user profile with which to associate the received swipe input, or if he or she wishes for the unmatched swipe input to be included in current user's alphabet. By way of specific example, a user may allow his or her child or significant other to use the device, thus an embodiment may detect an unknown user and subsequently request credentials. Once the owner or primary user verifies him or herself to the device via alternate credentials, he/she may wish to create a user profile for a child or significant other to allow that person to utilize the device. Once the new user profile is created, the additional received swipe will be associated with the new user profile.

Alternatively, an embodiment may skip the steps associated with 105 and 106, and jump straight to securing the touch device at 107. Thus, an embodiment may receive a swipe input at 101, compare the swipe input against known swipe patterns at 102, and based on the determination at 103, automatically secure the touch device at 107. Similar to the methods disclosed herein, an embodiment may secure the device in any known way; those discussed herein are only given as non-limiting examples.

Figure 3:
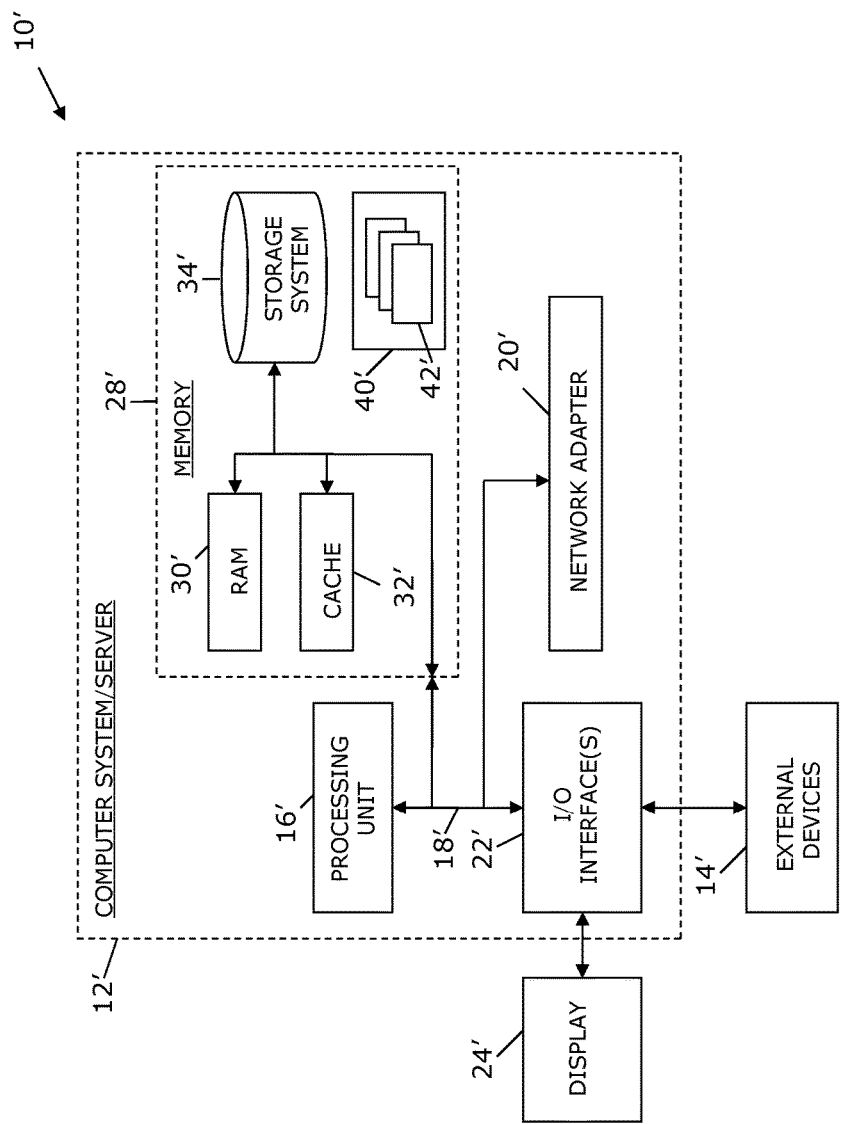
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for ensuring device security via swipe pattern recognition, the method comprising:
utilizing at least one processor to execute computer code that performs the steps of:
receiving, using a touch device, at least one swipe input of a user during interaction with the touch device, wherein the at least one swipe input comprises a plurality of swipes;
determining, using the at least one processor, if the at least one swipe input matches a known swipe pattern of the user, the match requiring exceeding a match confidence level, wherein the known swipe pattern is determined via a machine learning process that monitors touch input of a user during interaction with the touch device and groups the touch input into swipe pattern types based upon characteristics of the touch input, the swipe pattern types corresponding to a use case of the touch input;
the determining comprising comparing the at least one swipe input to the swipe pattern type corresponding to the use case of the at least one swipe input and determining a similarity between the at least one swipe input and the swipe pattern type, wherein the similarity is based on a determined sequence of the plurality of swipes within a predetermined window of time and wherein the similarity is based on at least one of: swipe speed, swipe acceleration, swipe length, swipe shape, and swipe pressure; and
responsive to said determining, executing an action associated with the touch device.

2. The method of claim 1,
wherein the machine learning comprises grouping historical swipes, received during normal use of the touch device, based on at least one similar characteristic.

3. The method of claim 1, wherein the action comprises securing the touch device against unauthorized use.

4. The method of claim 1, comprising generating at least one user profile corresponding to one or more subsets of the previously received swipes.

5. The method of claim 4, wherein the action comprises: prompting, using the processor, a user to enter identification credentials.

6. The method of claim 1, comprising:
detecting, using a sensor, a location of the touch device; wherein the action is responsive to the detected location.

7. The method of claim 1, comprising:
detecting, using a sensor, a movement of the touch device; wherein the action is responsive to the detected movement.

8. An apparatus for ensuring device security via swipe pattern recognition, the apparatus comprising:
a touch surface;
at least one processor; and
a computer readable storage medium having computer readable program code embodied therewith and executable by the at least one processor, the computer readable program code comprising:
computer readable program code that receives, at the touch surface, at least one swipe input during interaction with the touch device, wherein the at least one swipe input comprises a plurality of swipes;
computer readable program code that determines, using the at least one processor, if the at least one swipe input matches a known swipe pattern, the match requiring exceeding a match confidence level, wherein the known swipe pattern is determined via a machine learning process that monitors touch input of a user during interaction with the touch device and groups the touch input into swipe pattern types based upon characteristics of the touch input, the swipe pattern types corresponding to a use case of the touch input;
the determining comprising comparing the at least one swipe input to the swipe pattern type corresponding to the use case of the at least one swipe input and determining a similarity between the at least one swipe input and the swipe pattern type, wherein the similarity is based on a determined sequence of the plurality of swipes within a predetermined window of time and wherein the similarity is based on at least one of: swipe speed, swipe acceleration, swipe length, swipe shape, and swipe pressure; and
computer readable program code that, responsive to said determination, executes an action associated with the apparatus.

9. A computer program product for ensuring device security via swipe pattern recognition, the computer program product comprising:
a computer readable storage medium having computer readable program code embodied therewith, the computer readable program code comprising:
computer readable program code that receives, at the touch surface, at least one swipe input during interaction with the touch device, wherein the at least one swipe input comprises a plurality of swipes;
computer readable program code that determines, using the at least one processor, if the at least one swipe input matches a known swipe pattern, the match requiring exceeding a match confidence level, wherein the known swipe pattern is determined via a machine learning process that monitors touch input of a user during interaction with the touch device and groups the touch input into swipe pattern types based upon characteristics of the touch input, the swipe pattern types corresponding to a use case of the touch input;
the determining comprising comparing the at least one swipe input to the swipe pattern type corresponding to the use case of the at least one swipe input and determining a similarity between the at least one swipe input and the swipe pattern type, wherein the similarity is based on a determined sequence of the plurality of swipes within a predetermined window of time and wherein the similarity is based on at least one of: swipe speed, swipe acceleration, swipe length, swipe shape, and swipe pressure; and computer readable program code that responsive to said determination, executes an action associated with the touch device.

10. The computer program product of claim 9, wherein the machine learning comprises grouping historical swipes, received during normal use of the touch device, based on at least one similar characteristic.

11. The computer program product of claim 9, wherein the action comprises securing the touch device against unauthorized use.

12. The computer program product of claim 9, comprising generating at least one user profile corresponding to one or more subsets of the previously received swipes.

13. The computer program product of claim 12, wherein the action comprises: prompting, using the processor, a user to enter identification credentials.

14. The computer program product of claim 9, comprising:

detecting, using a sensor, a location of the touch device; wherein the action is responsive to the detected location.

15. The computer program product of claim 9, comprising:

detecting, using a sensor, a movement of the touch device; wherein the action is responsive to the detected movement.

16. A method of passive privacy preserving authentication for touch devices, the method comprising:

receiving, at a touch device, a sequence of strokes during interaction with the touch device, wherein the sequence of strokes comprises a plurality of strokes;

grouping, based on stoke characteristics, similar strokes;

generating, based on the grouped similar strokes, a user alphabet;

receiving, at the touch surface, at least one additional stroke;

determining, using a processor, if the at least one additional stroke shares one or more characteristics with the user alphabet, wherein the user alphabet is determined via a machine learning process that monitors touch input of a user during interaction with the touch device and groups the touch input into swipe pattern types based upon characteristics of the touch input, the swipe pattern types corresponding to a use case of the sequence of strokes;

the determining comprising comparing the sequence of strokes to the swipe pattern type corresponding to the use case of the sequence of strokes and determining a similarity between the sequence of strokes and the swipe pattern type, wherein the similarity is based on a determined sequence of the sequence of strokes within a predetermined window of time and wherein the similarity is based on at least one of: stroke speed, stroke acceleration, stroke length, stroke shape, and stroke pressure; and responsive to determining that the at least one additional stoke does not share one or more characteristics with the user alphabet, securing the touch device.

\* \* \* \* \*